UNITED STATES PATENT OFFICE.

BERNHARD JACQUES FLURSCHEIM, OF NEW YORK, N. Y., ASSIGNOR TO AETNA EXPLOSIVES COMPANY, INC., OF NEW YORK, N. Y., A CORPORATION OF NEW YORK.

PROCESS OF STABILIZING NITROSTARCH.

1,343,317. Specification of Letters Patent. Patented June 15, 1920.

No Drawing. Application filed May 17, 1917, Serial No. 169,264. Renewed March 5, 1920. Serial No. 363,593.

*To all whom it may concern:*

Be it known that I, BERNHARD JACQUES FLURSCHEIM, a subject of the King of Great Britain, residing at New York, county of New York, and State of New York, have invented a new and useful Improvement in Processes of Stabilizing Nitrostarch, of which the following is a full, clear, and exact description.

As is well known, nitrated starch, whether used independently as an explosive, or as an ingredient of an explosive, is liable to decomposition and spontaneous combustion. The object of this invention is to so treat nitrated starch as to prevent this decomposition; in other words, to stabilize it.

It has been proposed to wash, or otherwise treat, nitro-starch with various substances to effect its stabilization, and I am well aware that a number of patents have been issued covering the use of such substances as stabilizers, and that a very few of them are more or less efficient. This invention involves the discovery that nitro-starch may be made stable by treating with substances the use of which has not heretofore been suggested.

In order that those skilled in the art may be aided in the practice of my improved process, several preferred methods of procedure will be described, the details of which, however, are not essential features of the process.

The nitro-starch may be prepared by any of the well known processes of nitrating starch.

After the completion of the nitration, the nitro-starch is separated from the spent acid by filtration or other means, or the entire charge is drowned in water. It is then washed by boiling with several charges of fresh water until the acidity of the water is reduced to a minimum. It is then boiled with water to which has been added an amount of calcium carbonate sufficient to neutralize any acidity remaining in the nitro-starch. It is finally washed by boiling with water containing cyanamid. The final wash water, containing the stabilizer (cyanamid), is removed from the product by draining or by centrifuging. The product is then dried in the usual manner. A small amount of the stabilizer will ordinarily be left in the dried product.

An equally efficient stabilization may be effected by adding a solution of cyanamid to the nitro-starch at any temperature. That is, it is found practical not to wash by boiling with a solution of cyanamid, but to add the cyanamid solution to the nitro-starch while maintaining it at any desired temperature below the boiling point. In this mode of practising the process, all the stabilizer may be left in the dried finished product.

It will thus be clear that the final product may contain practically all, or substantially none, or any part, of the stabilizer. In either case the resultant product has a degree of stability exceeding that possessed by any stabilized nitrated starch of which I have knowledge.

I have successfully stabilized nitro-starch by employing not only cyanamid as such, but different salts of cyanamid, particularly calcium cyanamid. In claiming the use of cyanamid as a stabilizer, I wish to be understood as including in that term salts of cyanamid.

The proportion of the stabilizer in the stabilizing solution will vary with the particular stabilizer employed and may, indeed, with any given stabilizer, vary within a substantial range. Merely, therefore, as an example of what has been found to be efficient, it may be stated that it is preferred that if cyanamid as such is added, the solution may contain about 2 per cent. of cyanamid, and also if calcium cyanamid is added, the solution may contain about 2 per cent. of calcium cyanamid.

The intermediate treatment with calcium carbonate is not indispensable, but is preferred because it facilitates neutralization.

Having now fully described my invention, what I claim and desire to protect by Letters Patent is—

The hereinbefore described process of stabilizing nitro-starch which consists in washing it by boiling with an aqueous solution of cyanamid, eliminating the final wash water, and drying the product.

In testimony of which invention, I have hereunto set my hand, at Pittsburgh, Pa., on this 14th day of May, 1917.

BERNHARD JACQUES FLURSCHEIM.

Witnesses:
KARL W. WAMECASTLE,
CHAS. A. WOODS.